US012782207B2

(12) United States Patent
Lee et al.

(10) Patent No.: US 12,782,207 B2
(45) Date of Patent: Nov. 3, 2026

(54) BATTERY PRESSURE MEASURING SENSOR AND BATTERY PRESSURE MEASURING APPARATUS INCLUDING THE SAME

(71) Applicant: LG Energy Solution, Ltd., Seoul (KR)

(72) Inventors: Ki-Young Lee, Daejeon (KR); Dong-Wan Ko, Daejeon (KR); Do-Yul Kim, Daejeon (KR); Hye-Yun Bae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 493 days.

(21) Appl. No.: 18/279,146

(22) PCT Filed: Nov. 16, 2022

(86) PCT No.: PCT/KR2022/018131

§ 371 (c)(1),
(2) Date: Aug. 28, 2023

(87) PCT Pub. No.: WO2023/106675

PCT Pub. Date: Jun. 15, 2023

(65) Prior Publication Data

US 2024/0142322 A1 May 2, 2024

(30) Foreign Application Priority Data

Dec. 6, 2021 (KR) ........................ 10-2021-0173277

(51) Int. Cl.
*G01L 1/22* (2006.01)
*G01L 9/02* (2006.01)
(Continued)

(52) U.S. Cl.
CPC .................. *G01L 1/22* (2013.01); *G01L 9/02* (2013.01); *G01L 19/00* (2013.01); *H01M 10/48* (2013.01);
(Continued)

(58) Field of Classification Search
CPC .. G01L 1/22; G01L 9/02; G01L 19/00; H01M 10/48; H01M 10/42
See application file for complete search history.

(56) References Cited

U.S. PATENT DOCUMENTS 10,270,137 B1 * 4/2019 Pounds ............... H01M 10/482
2018/0006342 A1 1/2018 Lee et al.
(Continued)

FOREIGN PATENT DOCUMENTS

CN 106816929 A 6/2017
CN 108604149 B 6/2021
(Continued)

OTHER PUBLICATIONS

WO-2020051251 machine translation (Year: 2020).*
(Continued)

*Primary Examiner* — Kyung S Lee
(74) *Attorney, Agent, or Firm* — Lerner David LLP

(57) ABSTRACT

A battery pressure measuring sensor according to an embodiment of the present disclosure includes a substrate; a plurality of variable resistor units provided at a plurality of locations in consideration of a swelling characteristic of a battery on the substrate and configured to change a resistance value within a corresponding resistance range according to a pressure applied to each unit; and a plurality of sensing lines configured to be connected to the plurality of variable resistor units, respectively.

13 Claims, 10 Drawing Sheets

(51) Int. Cl.
*G01L 19/00* (2006.01)
*H01M 10/48* (2006.01)

(52) U.S. Cl.
CPC . *G01L 2019/0053* (2013.01); *H01M 2200/20* (2013.01)

(56) References Cited

U.S. PATENT DOCUMENTS

| | | | | |
|---|---|---|---|---|
| 2018/0287224 | A1 | 10/2018 | Ryoo et al. | |
| 2019/0041281 | A1* | 2/2019 | Li | G06F 3/045 |
| 2019/0049326 | A1 | 2/2019 | Li | |
| 2020/0200617 | A1 | 6/2020 | Toyoshima | |
| 2021/0328278 | A1 | 10/2021 | Asakawa et al. | |
| 2021/0341344 | A1 | 11/2021 | Bytheway et al. | |
| 2023/0033916 | A1 | 2/2023 | Kim et al. | |

FOREIGN PATENT DOCUMENTS

| | | | | | |
|---|---|---|---|---|---|
| CN | 112913068 | A | | 6/2021 | |
| EP | 4053963 | A1 | | 9/2022 | |
| JP | 2009076265 | A | | 4/2009 | |
| JP | 2014017141 | A | | 1/2014 | |
| JP | 2019184509 | A | | 10/2019 | |
| JP | 2021034219 | A | | 3/2021 | |
| JP | 2021131297 | A | | 9/2021 | |
| KR | 20170042082 | A | | 4/2017 | |
| KR | 20170084789 | A | | 7/2017 | |
| KR | 101900432 | B1 | | 9/2018 | |
| KR | 101913460 | B1 | | 10/2018 | |
| KR | 20180111314 | A | | 10/2018 | |
| KR | 20190106539 | A | | 9/2019 | |
| KR | 102152572 | B1 | | 9/2020 | |
| KR | 102175734 | B1 | | 11/2020 | |
| KR | 20210033647 | A | | 3/2021 | |
| KR | 20210117829 | A | | 9/2021 | |
| KR | 102703791 | B1 | * | 9/2024 | G01L 19/0092 |
| WO | WO-2020051251 | A1 | * | 3/2020 | H01M 10/6571 |
| WO | 2021187777 | A1 | | 9/2021 | |
| WO | WO-2024170314 | A1 | * | 8/2024 | H01M 10/425 |

OTHER PUBLICATIONS

WO-2024170314 machine translation (Year: 2024).*

KR-102703791 machine translation (Year: 2024).*

Extended European Search Report including Written Opinion for Application No. 22904508.3 dated Aug. 22, 2024, pp. 1-7.

International Search Report for Application No. PCT/KR2022/018131 mailed Feb. 22, 2023, pp. 1-4.

Search Report dated Mar. 24, 2026 from the Office Action for Chinese Application No. 202280021510.X issued Mar. 26, 2026 pp. 1-2.

* cited by examiner

BATTERY PRESSURE MEASURING SENSOR AND BATTERY PRESSURE MEASURING APPARATUS INCLUDING THE SAME

CROSS-REFERENCE TO RELATED APPLICATIONS

This application is a national phase entry under 35 U.S.C. § 371 of International Application No. PCT/KR2022/018131, filed on Nov. 16, 2022, which claims priority to Korean Patent Application No. 10-2021-0173277, filed on Dec. 6, 2021, the disclosures of which are incorporated herein by reference in their entireties.

TECHNICAL FIELD

The present disclosure relates to a battery pressure measuring sensor and a battery pressure measuring apparatus including the same, and more particularly, to a sensor capable of measuring the pressure of a battery and a battery pressure measuring apparatus including the same.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, a battery module is configured by connecting a plurality of battery cells in series/parallel, and a battery pack is configured by adding one or more battery modules and other components. This battery pack may be mainly used as an energy source for electric vehicles.

For example, the battery module may include battery cells compressed at a certain pressure. In this case, when the battery cells are repeatedly charged and discharged, the battery cells may swell. Here, swelling means that the battery cell is inflated due to charging and discharging. If the swelling of the battery cell becomes severe, the battery cell may be vented, or the battery cell may push the module frame and/or the battery pack case to damage the module frame and/or the battery pack case.

Therefore, it is necessary to develop a technology capable of ensuring the stability of the battery cell, the battery module and the battery pack by measuring the pressure of the battery cell and taking an appropriate measure corresponding to the swelling state before the swelling of the battery cell becomes severe.

DISCLOSURE

Technical Problem

The present disclosure is designed to solve the problems of the related art, and therefore the present disclosure is directed to providing a battery pressure measuring sensor that may accurately judge the swelling state of a battery cell and a battery pressure measuring apparatus including the same.

These and other objectives and advantages of the present disclosure may be understood from the following detailed description and will become more fully apparent from the exemplary embodiments of the present disclosure. Also, it will be easily understood that the objectives and advantages of the present disclosure may be realized by the means shown in the appended claims and combinations thereof.

Technical Solution

A battery pressure measuring sensor according to an aspect of the present disclosure may comprise: a substrate; a plurality of variable resistor units provided at a plurality of locations in consideration of a swelling characteristic of a battery on the substrate and configured to change a resistance value within a corresponding resistance range according to a pressure applied to each unit; and a plurality of sensing lines configured to be connected to the plurality of variable resistor units, respectively.

On the substrate, the plurality of variable resistor units may be configured to be provided at a first location where a preset risk when swelling occurs in the battery is set to be relatively low and at a second location where the preset risk is set to be relatively high.

The first location may be provided as a location corresponding to a preset center portion of the entire portion of the substrate.

The second location may be provided as a location corresponding to a peripheral portion excluding the center portion in the entire portion of the substrate.

The plurality of variable resistor units may be configured such that the resistance value is set as a criterion resistance value when the pressure is not applied, the resistance range of the resistance value according to the pressure of the variable resistor unit provided at the first location is a first resistance range, and the resistance range of the resistance value according to the pressure of the variable resistor unit provided at the second location is a second resistance range.

A lower limit of the first resistance range may be set to be equal to or greater than an upper limit of the second resistance range.

An upper limit of the first resistance range may be a resistance value at which the state of the battery can be judged as a preset swelling generation state.

The lower limit of the first resistance range and the upper limit of the second resistance range may be resistance values at which the state of the battery can be judged as a preset swelling warning state.

A lower limit of the second resistance range may be a resistance value at which the state of the battery can be judged as a preset swelling dangerous state.

The plurality of sensing lines may be configured such that a wire length of a sensing line connected to the variable resistor unit provided at the first location is longer than a wire length of a sensing line connected to the variable resistor unit provided at the second location.

The plurality of variable resistor units may be configured such that a size of the variable resistor unit provided at the first location is greater than a size of the variable resistor unit provided at the second location.

The plurality of variable resistor units may be configured such that the number of variable resistor units provided at the first location is less than the number of variable resistor units provided at the second location.

A battery pressure measuring apparatus according to another aspect of the present disclosure may comprise: the battery pressure measuring sensor according to an aspect of the present disclosure; an upper plate and a lower plate configured such that the battery is interposed therebetween; and a fixing unit configured to fix the upper plate and the lower plate.

The battery pressure measuring sensor may be configured to be located on at least one of the upper surface and the lower surface of the battery.

The battery pressure measuring apparatus according to still another aspect of the present disclosure may further comprise a control unit connected to the plurality of sensing lines to measure a resistance value of each of the plurality of variable resistor units and configured to judge a swelling state of the battery based on the plurality of measured resistance values.

The control unit may be configured to detect a location where the swelling occurs in the battery based on the plurality of measured resistance values.

The battery pressure measuring apparatus according to still another aspect of the present disclosure may further comprise a charging and discharging unit configured to charge and discharge the battery.

The control unit may be configured to judge the swelling state of the battery in the charging and discharging process of the battery.

The battery pressure measuring apparatus according to still another aspect of the present disclosure may further comprise a protection plate provided between the battery pressure measuring sensor and the battery and configured to be fixed together with the upper plate and the lower plate through the fixing unit.

A battery pack according to still another aspect of the present disclosure may comprise the battery pressure measuring sensor according to an aspect of the present disclosure.

Advantageous Effects

According to one aspect of the present disclosure, the swelling state of the battery may be precisely judged by measuring resistance values of a plurality of variable resistor units, respectively.

In addition, according to one aspect of the present disclosure, there is an advantage in that a portion of the corresponding battery in which swelling occurs may be specifically detected. The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as “first”, “second” and the like, may be used to distinguish one element from another among various elements, but not intended to limit the elements by the terms.

Throughout the specification, when a portion is referred to as “comprising” or “including” any element, it means that the portion may include other elements further, without excluding other elements, unless specifically stated otherwise.

In addition, throughout the specification, when a portion is referred to as being “connected” to another portion, it is not limited to the case that they are “directly connected”, but it also includes the case where they are "indirectly connected" with another element being interposed between them.

Hereinafter, preferred embodiments of the present disclosure will be described in detail with reference to the accompanying drawings.

Figure 1:
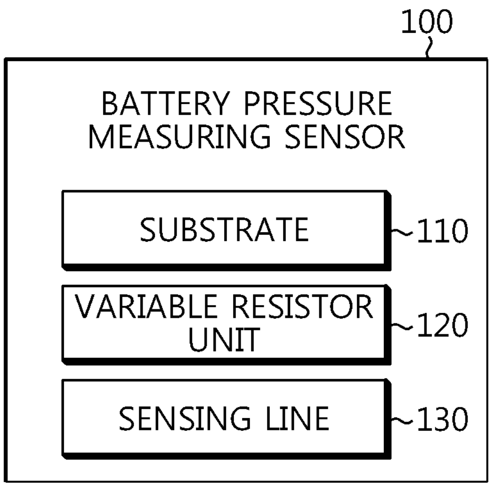
FIG. 1 is a diagram schematically showing a battery pressure measuring sensor according to an embodiment of the present disclosure.

FIG. 1 is a diagram schematically showing a battery pressure measuring sensor 100 according to an embodiment of the present disclosure.

Referring to FIG. 1, a battery pressure measuring sensor 100 may include a substrate 110, a variable resistor unit 120, and a sensing line 130.

The substrate 110 may be an insulating substrate configured in a plate shape to which a plurality of variable resistor units 120 and a plurality of sensing lines 130 may be attached. For example, the substrate 110 may be a circuit substrate (printed circuit). Preferably, the substrate 110 may be a flexible printed circuit (FPC).

Figure 2:
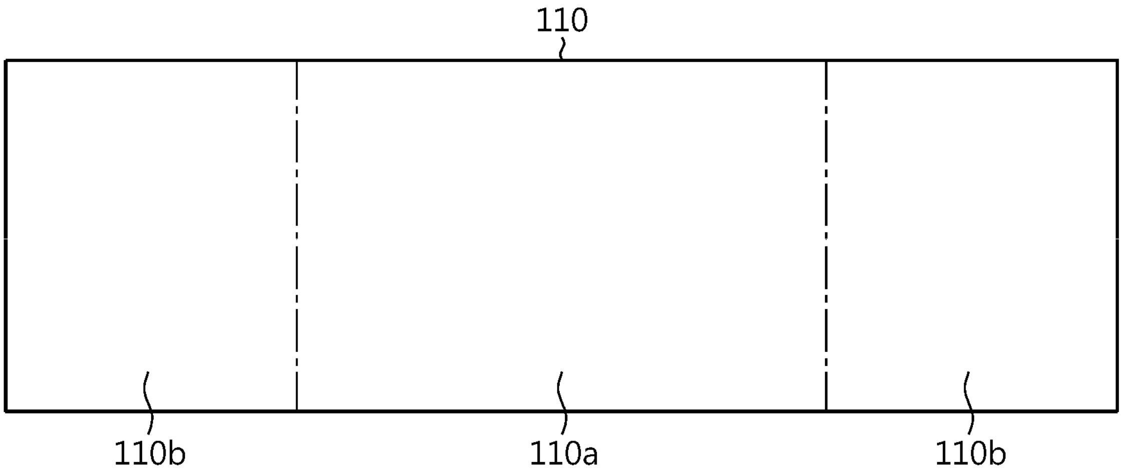
FIG. 2 is a diagram schematically showing a substrate included in the battery pressure measuring sensor according to an embodiment of the present disclosure.

FIG. 2 is a diagram schematically showing the substrate 110 included in the battery pressure measuring sensor 100 according to an embodiment of the present disclosure.

For example, referring to FIG. 2, the substrate 110 may have a rectangular shape corresponding to the shape of the battery. In addition, the substrate 110 may be previously divided into a center portion and a peripheral portion in consideration of swelling characteristics of the battery, and the plurality of variable resistor units 120 may be provided in the center portion or the peripheral portion of the substrate 110.

Here, the battery means one physically separable independent cell provided with a negative electrode terminal and a positive electrode terminal. For example, a lithium-ion battery or a lithium polymer battery may be regarded as a battery. Also, the battery may be a cylindrical type, a pouch type, or a prismatic type. Preferably, the battery may be a pouch type.

On the substrate 110, the plurality of variable resistor units 120 may be configured to be provided at a plurality of locations in consideration of a swelling characteristic of the battery.

Specifically, the variable resistor unit 120 may be plural, and the plurality of variable resistor units 120 may be provided at several locations of the substrate 110.

More specifically, the plurality of variable resistor units 120 may be configured to be provided at a first location **110*a* where a preset risk when battery swelling occurs in the substrate 110 is set to be relatively low and at a second location 110*b* where the preset risk is set be relatively high. Here, the first location 110*a* may be configured as a location corresponding to a preset center portion in the entire portion of the substrate 110. Also, the second location 110*b* may be configured as a location corresponding to a peripheral portion excluding the center portion in the entire portion of the substrate 110. That is, when the substrate 110 and the battery are in contact, the first location 110*a* of the substrate 110 may correspond to the center portion of the battery. In addition, when the substrate 110 and the battery are in contact, the second location 110*b* of the substrate 110** may correspond to the peripheral portion in which an electrode lead of the battery may be included.

For example, in the embodiment of FIG. 2, some of the plurality of variable resistor units 120 may be attached at the first location **110*a* corresponding to the center portion of the substrate 110. In addition, the rest of the plurality of variable resistor units 120 may be attached at the second location 110*b* corresponding to the peripheral portion of the substrate 110**.

The plurality of variable resistor units 120 may be configured such that a resistance value is changed within a corresponding resistance range according to a pressure applied to each unit. The plurality of sensing lines 130 may be configured to be connected to the plurality of variable resistor units 120, respectively.

Figure 3:
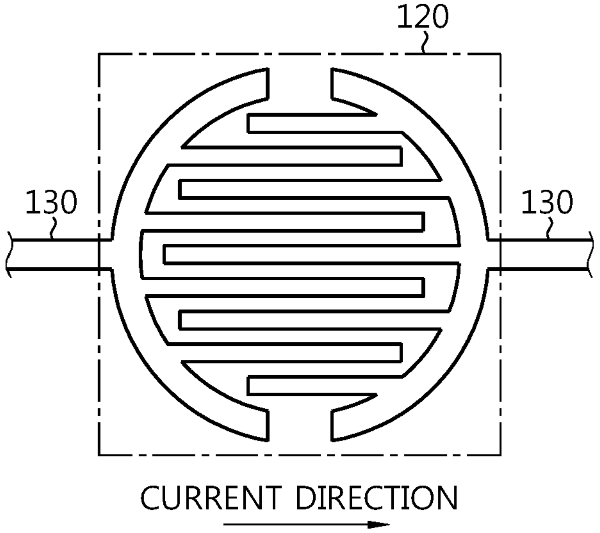
FIG. 3 is a diagram schematically showing a variable resistor unit and a sensing line included in the battery pressure measuring sensor according to an embodiment of the present disclosure.

FIG. 3 is a diagram schematically showing the variable resistor unit 120 and the sensing line 130 included in the battery pressure measuring sensor 100 according to an embodiment of the present disclosure.

Referring to FIG. 3, the sensing line 130 may be connected to one end and the other end of the variable resistor unit 120. In addition, a resistance value of the variable resistor unit 120 may be changed within a resistance range corresponding to the variable resistor unit 120 through current flowing through the variable resistor unit 120 and the sensing line 130.

Specifically, in the embodiment of FIG. 3, current applied from the sensing line 130 connected to one end of the variable resistor unit 120 may pass through the variable resistor unit 120 and be output to the sensing line 130 connected to the other end of the variable resistor unit 120. Also, when current passes through the variable resistor unit 120, the resistance value of the variable resistor unit 120 may be changed within a corresponding resistance range according to the pressure applied to the variable resistor unit 120.

The battery pressure measuring sensor 100 according to an embodiment of the present disclosure may measure pressure applied to the substrate 110 through the variable resistor unit 120 and the sensing line 130 attached at various locations of the substrate 110. For example, when pressure is applied to the substrate 110 attached to the battery due to swelling of the battery, the resistance value of the variable resistor unit 120 provided at the location where the pressure is applied may be changed. Therefore, the battery pressure measuring sensor 100 has an advantage of not only being used to judge whether swelling occurs in the battery, but also being usefully used to detect the location where battery swelling occurs.

The plurality of variable resistor units 120 may be configured such that a resistance value is set to a criterion resistance value when no pressure is applied.

Specifically, when pressure is not applied at a location of the substrate 110 to which the plurality of variable resistor units 120 are attached, the resistance value of the plurality of variable resistor units 120 may be a criterion resistance value regardless of a location on the substrate 110.

For example, the plurality of variable resistor units 120 may be set to have the criterion resistance value that is set to be close to 0 Ω when no external pressure is applied. Preferably, the plurality of variable resistor units 120 may have a resistance value of 0 Ω when no external pressure is applied. In this case, the criterion resistance value may be preset to 0 Ω.

In addition, the resistance range of the resistance value according to the pressure of the variable resistor unit 120 provided at the first location **110*a* of the substrate 110 may be a first resistance range, and the resistance range of the resistance value according to the pressure of the variable resistor unit 120 provided at the second location 110*b* of the substrate 110** may be a second resistance range.

In addition, the lower limit of the first resistance range may be configured to be set to be equal to or greater than the upper limit of the second resistance range. That is, all resistance values belonging to the first resistance range may be greater than or equal to all resistance values belonging to the second resistance range.

For example, the first resistance range may be 50,000 Ω or less and 10,000 Ω or more. In addition, the second resistance range may be 10,000 Ω or less and 1,000 Ω or more. In this case, the lower limit (10,000 Ω) of the first resistance range and the upper limit (10,000 Ω) of the second resistance range may be the same. Accordingly, all resistance values belonging to the first resistance range may be greater than or equal to all resistance values belonging to the second resistance range.

Here, as the pressure applied to the substrate 110 and the variable resistor unit 120 increases, the resistance value of the variable resistor unit 120 may decrease. That is, the strength of the applied pressure and the resistance value of the variable resistor unit 120 may be in inverse proportion to each other.

Referring to FIG. 2, when pressure is applied to the substrate 110 due to swelling of the battery, the resistance value of the variable resistor unit 120 included in the first location 110*a* may be greater than the resistance value of the variable resistor unit 120 included in the second location 110*b*.

That is, the battery pressure measuring sensor 100 according to an embodiment of the present disclosure has an advantage of accurately detecting the swelling location of the battery in contact with the substrate 110 by setting the resistance value of the variable resistor unit 120 differently according to the location attached to the substrate 110. In addition, when pressure due to swelling of the battery is applied to the substrate 110, since the resistance value of each of the plurality of variable resistor units 120 may be changed, whether or not swelling occurs in the battery may be judged more accurately.

In general, when swelling occurs in the battery, the center portion of the battery swells first, and the peripheral portion including electrodes of the battery may swell later than the center portion. This phenomenon appears because positive electrode active materials and negative electrode active materials are concentrated more in the center portion of the battery than in the peripheral portion of the battery, so that electrochemical reactions occur more actively. In addition, an upper case and a lower case of the battery may be sealed at the peripheral portion of the battery, and electrode leads may be connected to the peripheral portion of the battery. Therefore, when swelling occurs in the battery, the center portion of the battery may swell earlier than the peripheral portion of the battery.

For this reason, when the resistance value of the variable resistor unit 120 provided at the first location 110*a* of the substrate 110 corresponding to the center portion of the battery is included within the first resistance range, it may be judged that swelling occurs in the battery.

Specifically, the upper limit of the first resistance range is a resistance value at which the state of the battery can be judged as a preset swelling generation state. That is, when the resistance value of the variable resistor unit 120 is equal to the upper limit of the first resistance range, the state of the battery may be in a state where the preset risk is low even though swelling occurs. This is because, as described above, the pressure applied to the variable resistor unit 120 and the resistance value of the variable resistor unit 120 are in inverse proportion to each other. That is, when the resistance value of at least one of the plurality of variable resistor units 120 provided at the first location 110*a* of the substrate 110 is equal to the upper limit of the first resistance range, the state of the battery can be judged as a swelling generation state in which the risk is relatively low.

Next, when the center portion of the battery is further inflated or the peripheral portion of the battery is inflated, the sealed upper and lower cases may be vented so that electrolyte or the like may leak out of the battery. In this case, the risk when swelling occurs in the battery may be higher than that of the swelling generation state because a fire or explosion may occur in the battery.

Specifically, the lower limit of the first resistance range and the upper limit of the second resistance range are resistance values at which the state of the battery can be judged as a preset swelling warning state. That is, when the resistance value of at least one of the plurality of variable resistor units 120 provided at the first location 110*a* of the substrate 110 is equal to the lower limit of the first resistance range or the resistance value of at least one of the plurality of variable resistor units 120 provided at the second location 110*b* is equal to the upper limit of the second resistance range, the battery may be in a state where swelling has occurred and the preset risk is middle. That is, the state of the battery can be judged as a swelling warning state where the risk is higher than that of the swelling generation state.

Finally, the lower limit of the second resistance range is a resistance value at which the state of the battery can be judged as a preset swelling dangerous state. That is, when the resistance value of at least one of the plurality of variable resistor units 120 provided at the second location 110*b* of the substrate 110 is equal to the lower limit of the second resistance range, the battery may be in a state where the risk is highest and there is a very high possibility of fire or explosion. Therefore, the state of the battery can be judged as a swelling dangerous state with the highest risk.

That is, the battery pressure measuring sensor 100 according to an embodiment of the present disclosure has an advantage of subdividing and judging the state of the battery according to the swelling risk by setting the resistance range to which the resistance value of the variable resistor unit 120 can belong differently according to the location attached to the substrate 110. However, in the above embodiment, the state of the battery is divided into a swelling generation state, a swelling warning state and a swelling dangerous state, but it should be noted that the state of the battery can be more diversely classified according to more subdivided risks.

Hereinafter, various embodiments of the battery pressure measuring sensor 100 will be described with reference to FIGS. 4 to 6.

Figure 4:
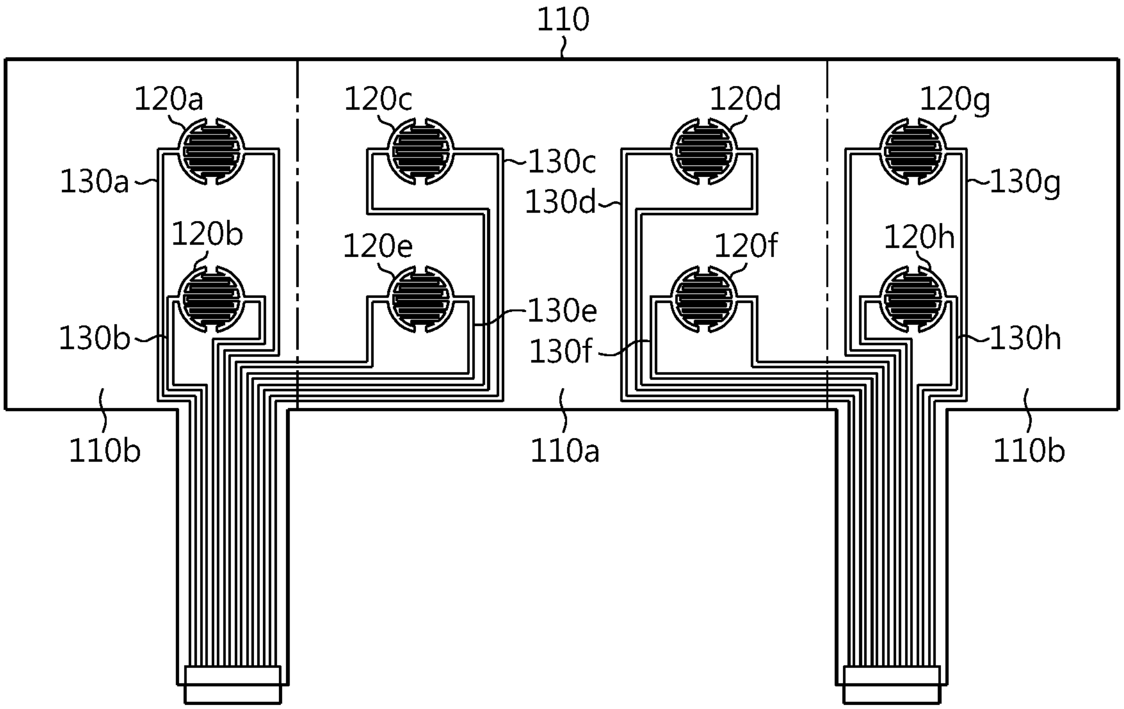
FIG. 4 is a diagram schematically showing a first embodiment of the battery pressure measuring sensor according to an embodiment of the present disclosure.

FIG. 4 is a diagram schematically showing a first embodiment of the battery pressure measuring sensor 100 according to an embodiment of the present disclosure.

The plurality of sensing lines 130 may be configured so that the wire length of the sensing line 130 connected to the variable resistor unit 120 provided at the first location 110*a* is longer than the wire length of the sensing line 130 connected to the variable resistor unit 120 provided at the second location 110*b*.

As described with reference to FIG. 3, current is applied to the variable resistor unit 120 through the sensing line 130 connected to one end of the variable resistor unit 120, and the current passing through the variable resistor unit 120 may be output through the sensing line 130 connected to the other end of the variable resistor unit 120. Therefore, as the sum of the total lengths of the sensing line 130 increases, the resistance value of the variable resistor unit 120 when pressure is applied may increase.

The wire length of the sensing line 130 connected to the variable resistor unit 120 provided at the first location 110*a* of the substrate 110 may be longer than the wire length of the sensing line 130 connected to the variable resistor unit 120 provided at the second location 110*b* of the substrate 110. Specifically, the variable resistor unit 120 provided at the first location 110*a* of the substrate 110 may respond more sensitively to the applied pressure than the variable resistor unit 120 provided at the second location 110*b*. That is, even if a small pressure is applied to the variable resistor unit 120 provided at the first location 110*a*, it may have a high resistance value.

Referring to FIG. 4, the substrate 110 may include a plurality of variable resistor units 120*a* to 120*h* and a plurality of sensing lines 130*a* to 130*h*. Specifically, the first location 110*a* may include a third variable resistor unit 120, a fourth variable resistor unit 120, a fifth variable resistor unit 120, and a sixth variable resistor unit 120. Also, the second location 110*b* may include a first variable resistor unit 120, a second variable resistor unit 120, a seventh variable resistor unit 120, and an eighth variable resistor unit 120.

In the embodiment of FIG. 4, it is assumed that the lengths of the sensing lines 130*c*, 130*d*, 130*e* and 130*f* connected to the plurality of variable resistor units 120*c*, 120*d*, 120*e* and 120*f* included in the first location 110*a* are similar enough to not significantly differ. Similarly, it is assumed that the lengths of the sensing lines 130*a*, 130*b*, 130*g*, and 130*h* connected to the plurality of variable resistor units 120*a*, 120*b*, 120*g*, and 120*h* included in the second location 110*b* are similar enough to not significantly differ. Therefore, the resistance values of the plurality of variable resistor units 120*c*, 120*d*, 120*e* and 120*f* included in the first location 110*a* may belong to the first resistance range (for example, 50,000 Ω or less and 10,000 Ω or more), and the resistance values of the plurality of variable resistor units 120*a*, 120*b*, 120*g* and 120*h* included in the second location 110*b* may belong to the second resistance range (for example, less than 10,000 Ω and more than 1,000 Ω).

For example, if the resistance value of at least one of the plurality of variable resistor units 120*a* to 120*h* is equal to the upper limit (for example, 50,000 Ω) of the first resistance range, the state of the battery in contact with the substrate 110 may be judged as a swelling generation state.

As another example, if the resistance value of at least one of the plurality of variable resistor units 120*a* to 120*h* is equal to the lower limit (for example, 10,000 Ω) of the first resistance range or the upper limit (for example, 10,000 Ω) of the second resistance range, the state of the battery in contact with the substrate 110 may be judged as a swelling warning state.

As still another example, if the resistance value of at least one of the plurality of variable resistor units 120*a* to 120*h* is equal to the lower limit (for example, 1,000 Ω) of the second resistance range, the state of the battery in contact with the substrate 110 may be judged as a swelling dangerous state.

That is, the battery pressure measuring sensor 100 according to an embodiment of the present disclosure has an advantage of sensitively detecting whether swelling occurs in the battery and specifically detecting the location where battery swelling occurs by differently configuring the wire length of the sensing line 130 connected to the variable resistor unit 120 according to the location of the variable resistor unit 120 attached to the substrate 110.

Figure 5:
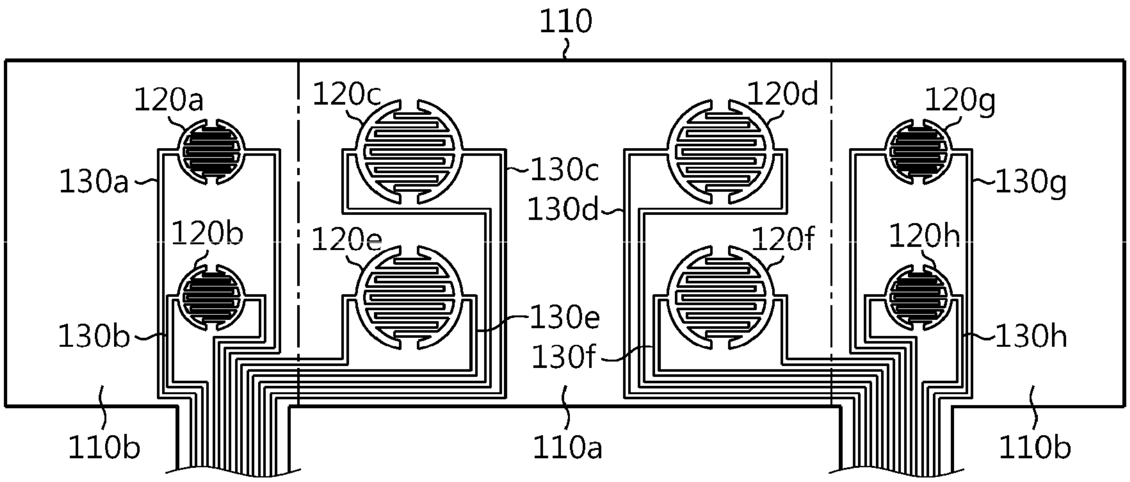
FIG. 5 is a diagram schematically showing a second embodiment of the battery pressure measuring sensor according to an embodiment of the present disclosure.

FIG. 5 is a diagram schematically showing a second embodiment of the battery pressure measuring sensor 100 according to an embodiment of the present disclosure.

The plurality of variable resistor units 120 may be configured such that the size of the variable resistor unit 120 provided at the first location 110*a* is greater than the size of the variable resistor unit 120 provided at the second location 110*b*.

Specifically, as the size of the variable resistor unit 120 increases, the resistance value of the variable resistor unit 120 when pressure is applied may increase. This is because the variable resistor unit 120 may respond more sensitively to the applied pressure as the size increases. Accordingly, the size of the variable resistor unit 120 included in the first location 110*a* of the substrate 110 may be greater than the size of the variable resistor unit 120 included in the second location 110*b* of the substrate 110.

For example, in the embodiment of FIG. 5, the size of the plurality of variable resistor units 120*c*, 120*d*, 120*e* and 120*f* included in the first location 110*a* may be greater than the size of the plurality of variable resistor units 120*a*, 120*b*, 120*g* and 120*h* included in the second location 110*b*. Therefore, the resistance values of the plurality of variable resistor units 120*c*, 120*d*, 120*e* and 120*f* included in the first location 110*a* may belong to the first resistance range (for example, 50,000 Ω or less and 10,000 Ω or more), and the resistance values of the plurality variable resistor units 120*a*, 120*b*, 120*g* and 120*h* included in the second location 110*b* may belong to the second resistance range (for example, 10,000 Ω or less and 1,000 Ω or more).

That is, the battery pressure measuring sensor 100 according to an embodiment of the present disclosure has an advantage of sensitively detecting whether swelling occurs in the battery and specifically detecting the location where battery swelling occurs by configuring the size of the variable resistor unit 120 differently according to the location of the variable resistor unit 120 attached to the substrate 110.

Figure 6:
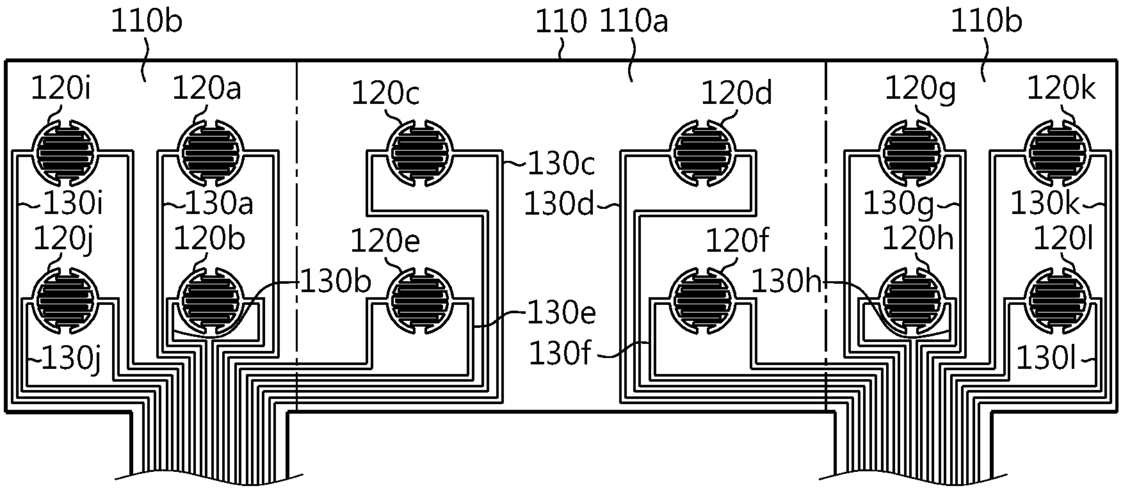
FIG. 6 is a diagram schematically showing a third embodiment of the battery pressure measuring sensor according to an embodiment of the present disclosure.

FIG. 6 is a diagram schematically showing a third embodiment of the battery pressure measuring sensor 100 according to an embodiment of the present disclosure.

The plurality of variable resistor units 120 may be configured such that the number of variable resistor units 120 provided at the first location 110*a* is less than the number of variable resistor units 120 provided at the second location 110*b*.

Specifically, the second location 110*b* of the substrate 110 may correspond to the peripheral portion of the battery. As described above, when the peripheral portion of the battery, which may include the electrode leads of the battery, is inflated due to swelling, the battery may be vented and there is a risk of fire or explosion. Therefore, it is important to accurately judge whether swelling occurs in the peripheral portion of the battery rather than in the center portion of the battery for accident prevention.

For example, in the embodiment of FIG. 6, a plurality of variable resistor units 120*c*, 120*d*, 120*e* and 120*f* may be included in the first location 110*a* of the substrate 110, and a plurality of variable resistor units 120*a*, 120*b*, 120*g*, 120*h*, 120*i*, 120*j*, 120*k* and 120*l* may be included in the second location 110*b* of the substrate 110.

That is, the battery pressure measuring sensor 100 according to an embodiment of the present disclosure has an advantage of more accurately detecting swelling generated in the peripheral portion of the battery by configuring the number of variable resistor units 120 differently depending on the location of the substrate 110.

In the above, the first embodiment in which the wire length of the sensing line 130 connected to the variable resistor unit 120 is different, the second embodiment in which the size of the variable resistor unit 120 is different, and the third embodiment in which the number of variable resistor units 120 is different have been described. However, it should be noted that the first to third embodiments may be combined with each other in a complementary manner.

Figure 7:
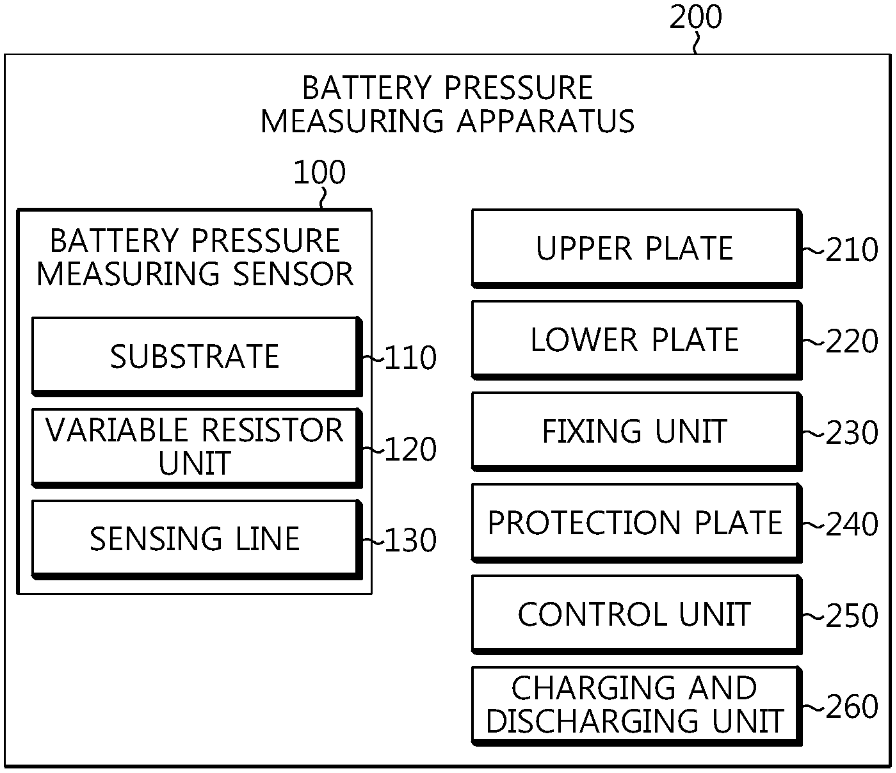
FIG. 7 is a diagram schematically showing a battery pressure measuring apparatus according to another embodiment of the present disclosure.

FIG. 7 is a diagram schematically showing a battery pressure measuring apparatus 200 according to another embodiment of the present disclosure.

Referring to FIG. 7, a battery pressure measuring apparatus 200 may include a battery pressure measuring sensor 100, an upper plate 210, a lower plate 220, and a fixing unit 230. Here, since the battery pressure measuring sensor 100 has been described above, a detailed description thereof will be omitted.

The battery pressure measuring sensor 100 may be configured to be located on at least one of an upper surface and a lower surface of the battery.

Figure 8:
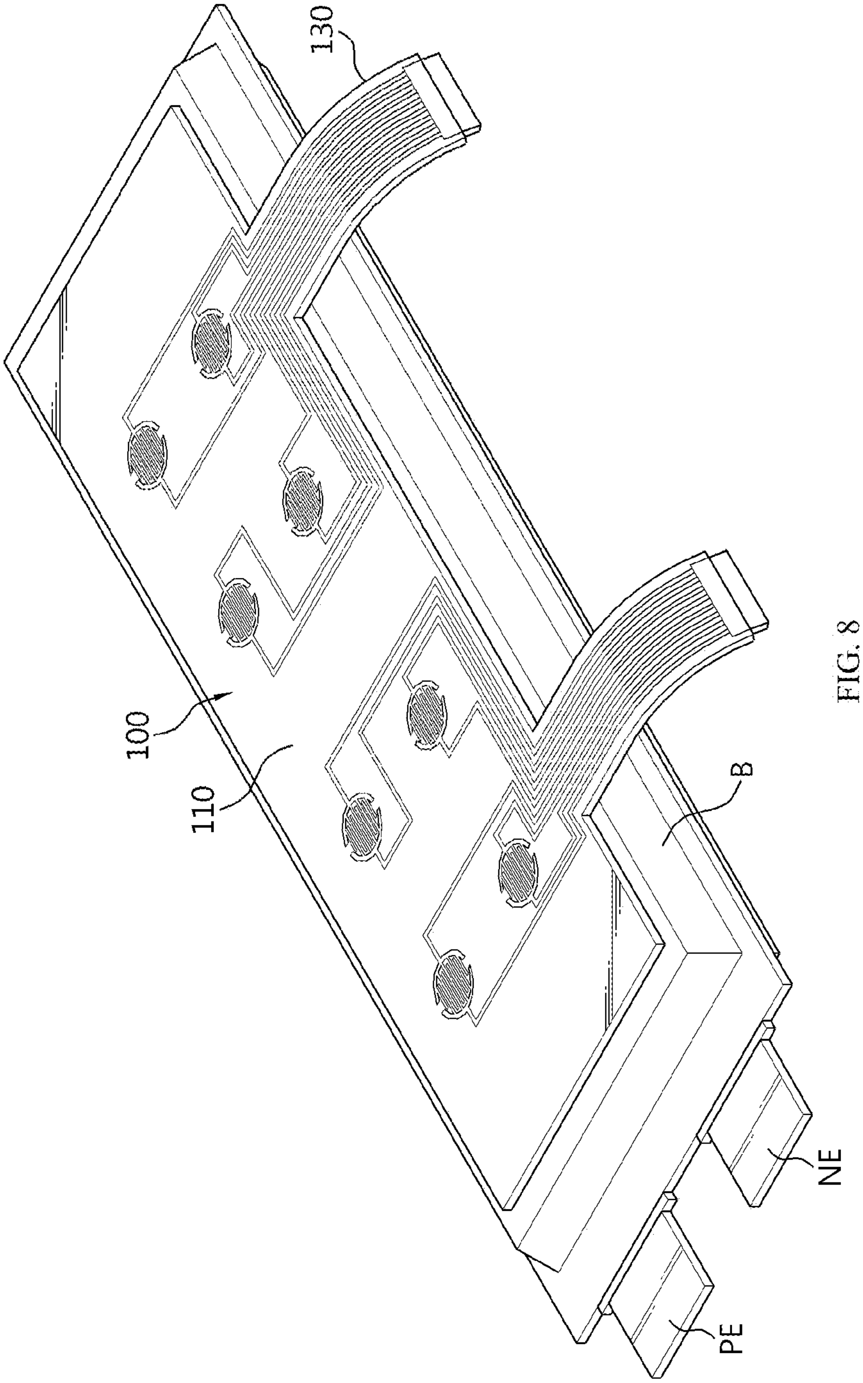
FIG. 8 is a diagram schematically showing an embodiment in which the battery pressure measuring sensor according to an embodiment of the present disclosure is attached to a battery.

FIG. 8 is a diagram schematically showing an embodiment in which the battery pressure measuring sensor 100 according to an embodiment of the present disclosure is attached to a battery B.

For example, referring to the embodiment of FIG. 8, the battery B may be a pouch-type battery cell including a positive electrode terminal PE and a negative electrode terminal NE. In the embodiment of FIG. 8, the positive electrode terminal PE and the negative electrode terminal NE are provided together at one end of the battery B, but in another embodiment, the positive electrode terminal PE and the negative electrode terminal NE may be provided at one end and the other end of the battery B, respectively.

The battery pressure measuring sensor 100 may be attached to the upper surface of the battery B. Specifically, a plurality of variable resistor units 120 and a plurality of sensing lines 130 may be attached to the upper surface of the substrate 110. In addition, the lower surface of the substrate 110 may be attached to the upper surface of the battery B.

The upper plate 210 and the lower plate 220 may be configured such that the battery B may be interposed therebetween.

For example, the lower surface of the upper plate 210 and the upper surface of the lower plate 220 may be located to face each other. In addition, the battery B may be interposed between the upper plate 210 and the lower plate 220. That is, the upper plate 210 may be located on the upper surface of the battery B, and the lower plate 220 may be located on the lower surface of the battery B.

The fixing unit 230 may be configured to fix the upper plate 210 and the lower plate 220. Specifically, the fixing unit 230 may be configured to pass through the upper plate 210 and the lower plate 220 to fix the upper plate 210 and the lower plate 220. Also, preferably, the upper plate 210 and/or the lower plate 220 may move along the fixing unit 230, so that a distance between the upper plate 210 and the lower plate 220 may be adjusted.

Figure 9:
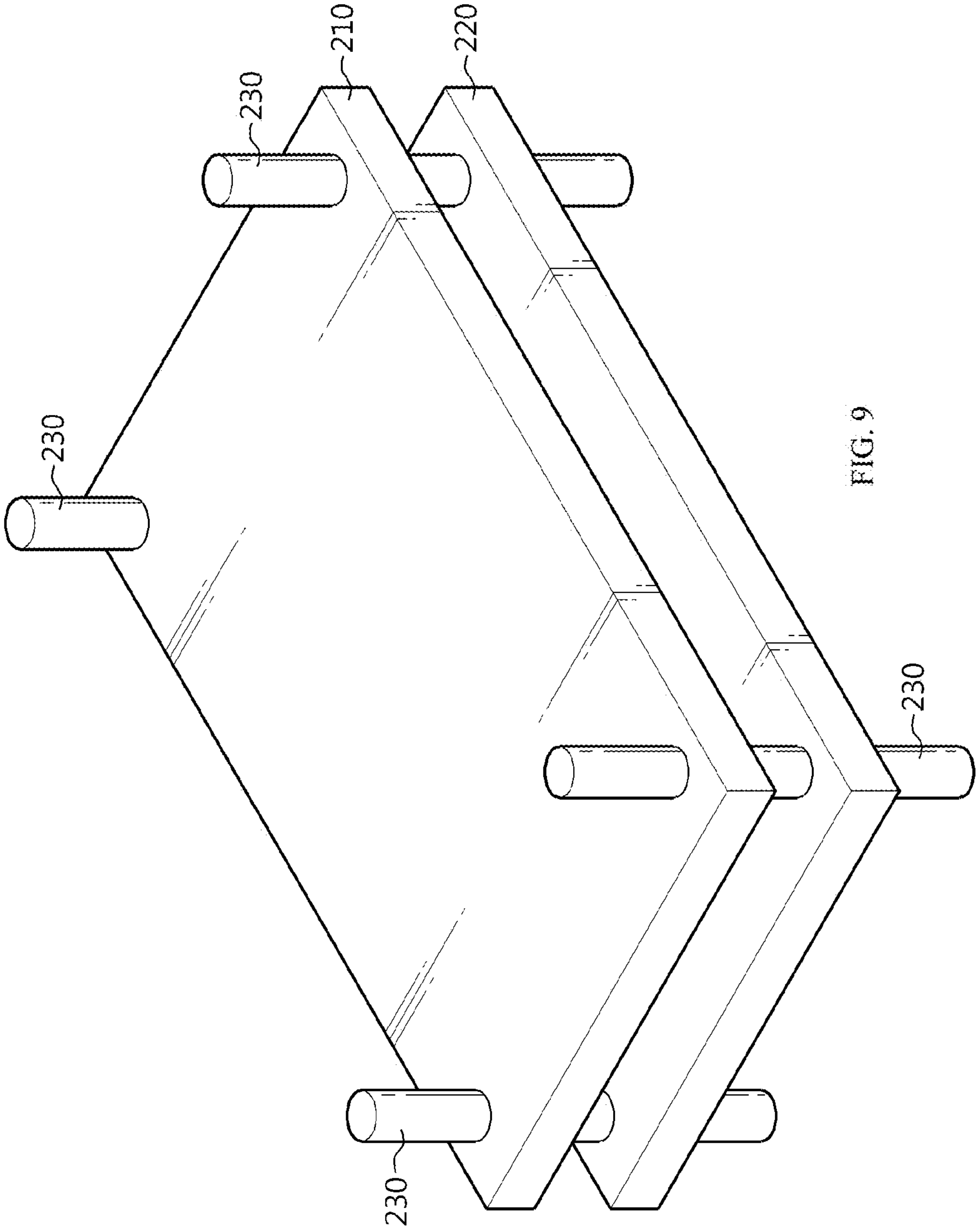
FIG. 9 is a diagram schematically showing an upper plate, a lower plate and a fixing unit included in the battery pressure measuring apparatus according to another embodiment of the present disclosure.

FIG. 9 is a diagram schematically showing the upper plate 210, the lower plate 220 and the fixing unit 230 included in the battery pressure measuring apparatus 200 according to another embodiment of the present disclosure.

For example, in the embodiment of FIG. 9, a plurality of fixing units 230 may be provided. Also, the fixing unit 230 may pass through the upper plate 210 and the lower plate 220 to fix the upper plate 210 and the lower plate 220. Preferably, in order to minimize shaking of the upper plate 210 and the lower plate 220, the fixing unit 230 may be configured to pass through the corner portions of the upper plate 210 and the lower plate 220.

Figure 10:
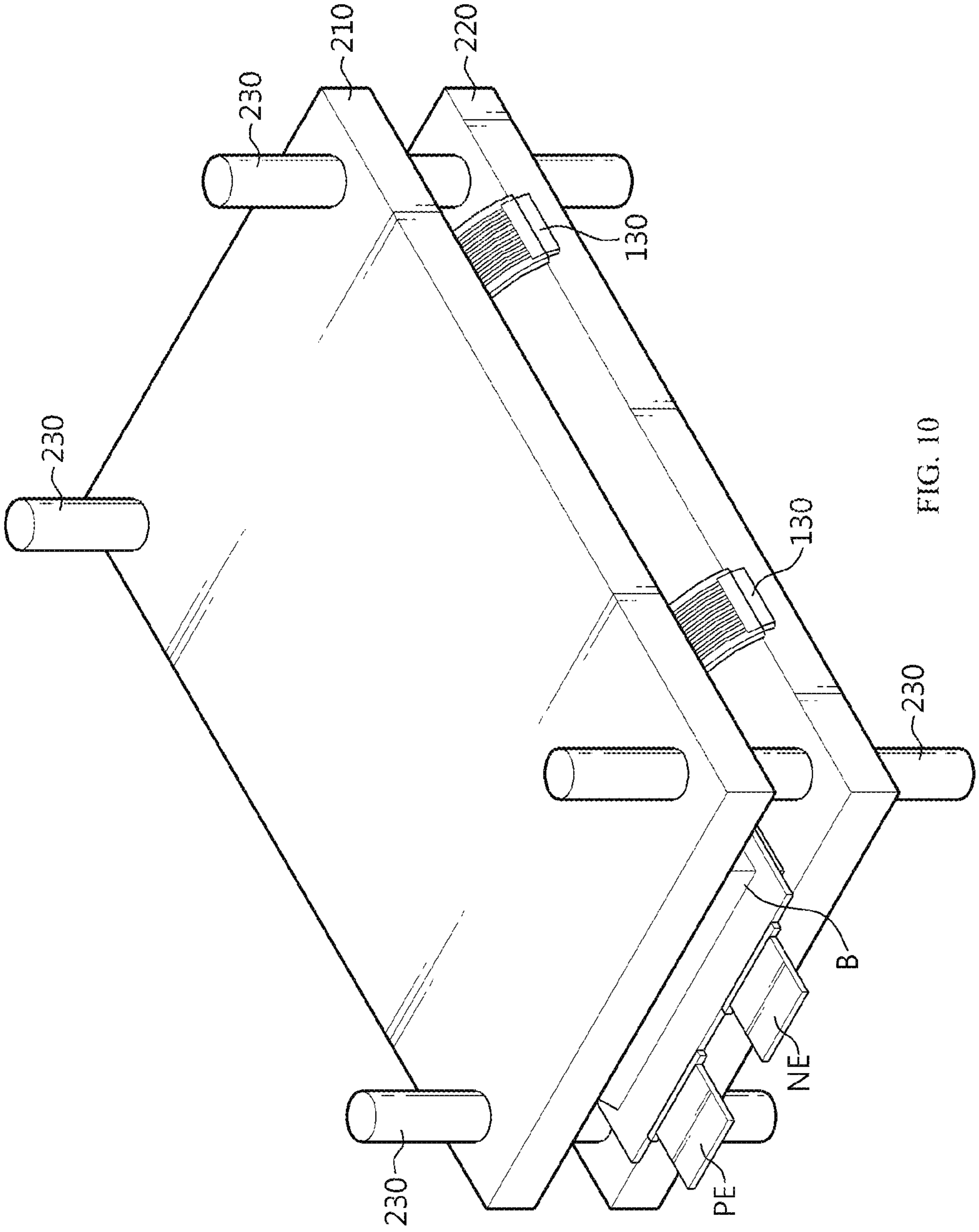
FIGS. 10 and 11 are diagrams schematically showing a first embodiment of the battery pressure measuring apparatus according to another embodiment of the present disclosure.
Figure 11:
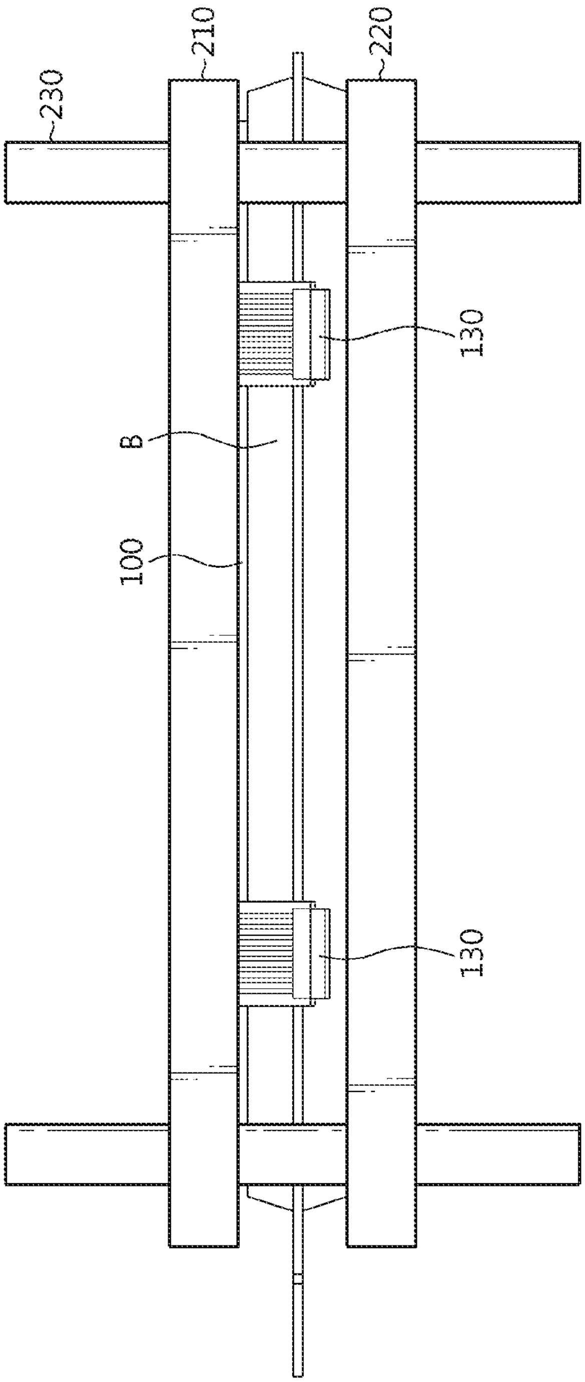

FIGS. 10 and 11 are diagrams schematically showing a first embodiment of the battery pressure measuring apparatus 200 according to another embodiment of the present disclosure.

Referring to FIGS. 10 and 11, the battery pressure measuring sensor 100 may be attached to the upper surface of the battery B. Also, the lower plate 220 may be located under the battery B, and the upper plate 210 may be located above the battery B. That is, the battery B and the battery pressure measuring sensor 100 may be interposed between the upper plate 210 and the lower plate 220, and the upper plate 210 and the lower plate 220 may be fixed by the fixing unit 230. Therefore, when swelling occurs in the battery B, since pressure is applied toward the substrate 110, the resistance value of the variable resistor unit 120 attached to the substrate 110 may be changed within a corresponding resistance range.

Figure 12:
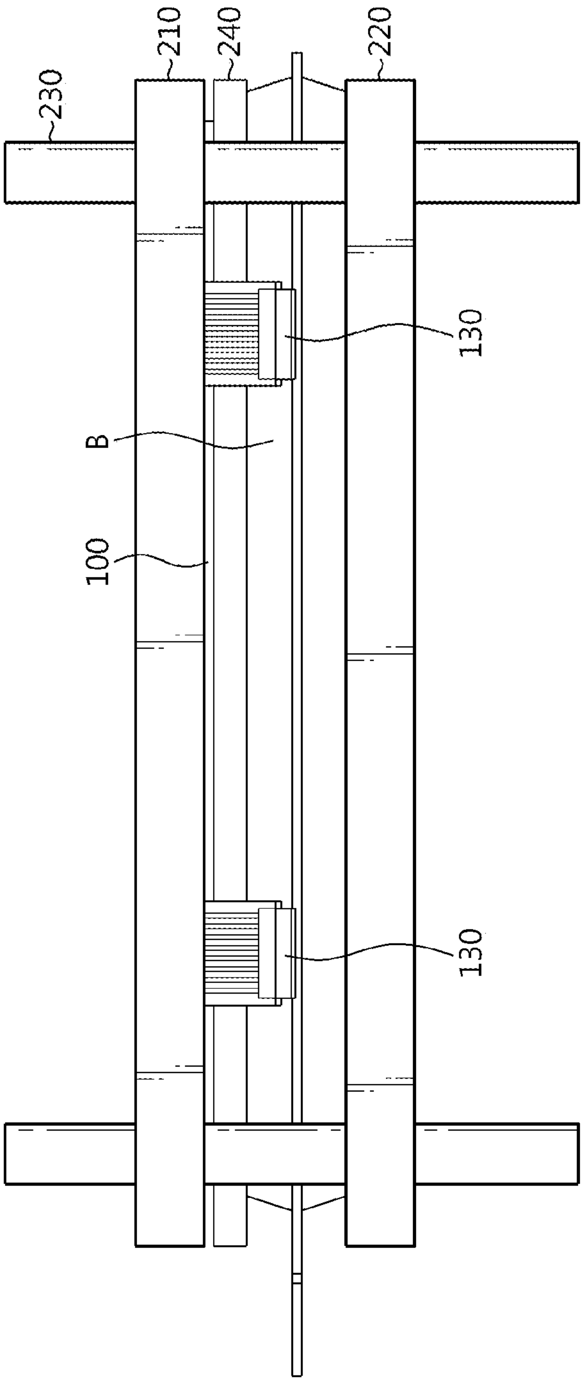
FIG. 12 is a diagram schematically showing a second embodiment of the battery pressure measuring apparatus according to another embodiment of the present disclosure.

FIG. 12 is a diagram schematically showing a second embodiment of the battery pressure measuring apparatus 200 according to another embodiment of the present disclosure.

Referring to FIG. 12, the battery pressure measuring apparatus 200 may further include a protection plate 240.

The protection plate 240 may be provided between the battery pressure measuring sensor 100 and the battery B and configured to be fixed together with the upper plate 210 and the lower plate 220 through the fixing unit 230.

When the surface pressure of the battery B is measured only with the battery pressure measuring sensor 100, marks may be generated on the main body of the battery B due to the shape of the battery pressure measuring sensor 100. Due to the marks generated in this way, the electrolyte inside the battery B may spread unbalanced, which may result in performance degradation of the battery B.

Accordingly, the battery pressure measuring apparatus 200 may further include a protection plate 240 interposed between the battery B and the battery pressure measuring sensor 100.

For example, in the embodiment of FIG. 12, the protection plate 240 may be located on the upper surface of the battery B. In addition, the battery pressure measuring sensor 100 may be located on the upper surface of the protection plate 240. The battery B, the protection plate 240, and the battery pressure measuring sensor 100 may be interposed and fixed between the upper plate 210 and the lower plate 220.

That is, since the battery pressure measuring apparatus 200 according to an embodiment of the present disclosure further includes the protection plate 240, there is an advantage of preventing damage to the battery B during the battery pressure measurement process.

Figure 13:
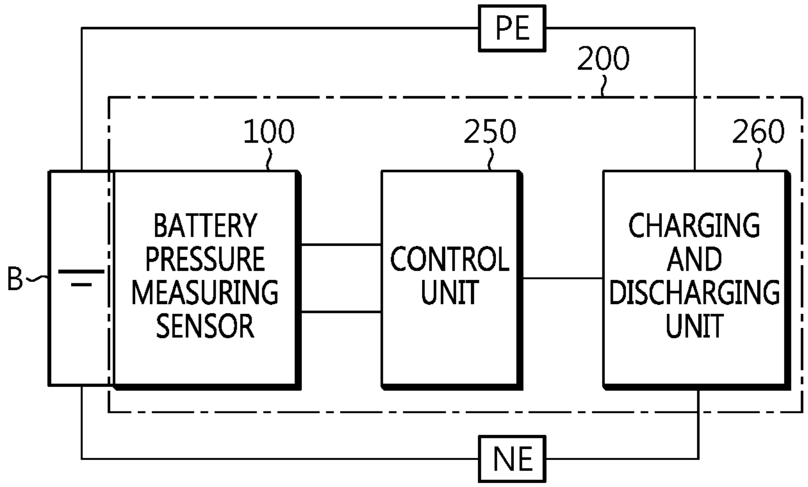
FIG. 13 is a diagram schematically showing an exemplary configuration of the battery pressure measuring apparatus according to another embodiment of the present disclosure.

FIG. 13 is a diagram schematically showing an exemplary configuration of the battery pressure measuring apparatus 200 according to another embodiment of the present disclosure.

The battery pressure measuring apparatus 200 may further include a control unit 250 and a charging and discharging unit 260.

The charging and discharging unit 260 may be configured to charge and discharge the battery B.

For example, in the embodiment of FIG. 13, the charging and discharging unit 260 may be electrically connected to the positive electrode terminal PE and the negative electrode terminal NE of the battery B. Also, the charging and discharging unit 260 may charge and discharge the battery B based on a charge and discharge signal received from the control unit 250.

The control unit 250 may be configured to judge the swelling state of the battery B in the charging and discharging process of the battery B.

Specifically, the control unit 250 may be configured to be connected to the plurality of sensing lines 130 to measure the resistance value of each of the plurality of variable resistor units 120 and judge the swelling state of the battery B based on the plurality of measured resistance values. For example, in the embodiments of FIGS. 4 and 5, the control unit 250 may be connected to the plurality of sensing lines 130*a* to 130*h* and measure the resistance value of each plurality of variable resistor units 120*a* to 120*h*. In the embodiment of FIG. 6, the control unit 250 may be connected to the plurality of sensing lines 130*a* to 130*l* and measure the resistance value of each of the plurality of variable resistor units 120*a* to 120*l*.

For example, in the embodiment of FIG. 13, the control unit 250 may be connected to the battery pressure measuring sensor 100. Preferably, the control unit 250 may be connected to each sensing line 130 included in the battery pressure measuring sensor 100. In addition, the control unit 250 may judge the swelling state of the battery B using each sensing line 130.

Specifically, the control unit 250 may output a predetermined current to the sensing line 130 connected to one end of the variable resistor unit 120 and receive current from the sensing line 130 connected to the other end of the variable resistor unit 120. The resistance value of the variable resistor unit 120 may be calculated using the output current to the sensing line 130 and the input current from the sensing line 130. The control unit 250 may judge the swelling state of the battery B based on the plurality of calculated resistance values.

That is, in the embodiments of FIGS. 11 and 12, the charging and discharging unit 260 may be connected to the positive electrode terminal PE and the negative electrode terminal NE of the battery B. Also, the battery pressure measuring sensor 100 attached to the battery B and the control unit 250 may be connected. Preferably, the plurality of sensing lines 130 included in the battery pressure measuring sensor 100 and the control unit 250 may be connected.

For example, in the embodiment of FIG. 13, if the resistance value of at least one of the plurality of variable resistor units 120 included in the battery pressure measuring sensor 100 is equal to the upper limit (for example, 50,000 Ω) of the first resistance range, the control unit 250 may judge that the state of the battery B is a swelling generation state.

As another example, in the embodiment of FIG. 13, if the resistance value of at least one of the plurality of variable resistor units 120 included in the battery pressure measuring sensor 100 is equal to the lower limit (for example, 10,000 Ω) of the first resistance range or the upper limit (for example, 10,000 Ω) of the second resistance range, the control unit 250 may judge that the state of the battery B is a swelling warning state.

As still another example, in the embodiment of FIG. 13, if the resistance value of at least one of the plurality of variable resistor units 120 included in the battery pressure measuring sensor 100 is equal to the lower limit (for example, 1,000 Ω) of the second resistance range, the control unit 250 may judge that the state of the battery B is a swelling dangerous state.

The battery pressure measuring apparatus 200 according to an embodiment of the present disclosure has an advantage of specifically judging the swelling state of the battery B based on the resistance value of the variable resistor units 120 provided at a plurality of locations on the substrate 110.

In addition, the control unit 250 may be configured to detect a location where swelling occurs in the battery B based on the plurality of measured resistance values.

Specifically, the control unit 250 may measure a resistance value of each of the plurality of variable resistor units 120 provided on the substrate 110. Accordingly, the control unit 250 may detect not only the swelling state of the battery B, but also a location where swelling occurs in the battery B.

For example, in the embodiment of FIG. 5, when the resistance values of the fourth variable resistor unit 120*d* and the sixth variable resistor unit 120*f* are equal to the upper limit (for example, 50,000 Ω) of the first resistance range, the control unit 250 may judge the state of the battery B as a swelling generation state and determine the location where swelling occurs as locations corresponding to the fourth variable resistor unit 120*d* and the sixth variable resistor unit 120*f*.

Meanwhile, the control unit 250 provided to the battery pressure measuring apparatus 200 may selectively include processors, application-specific integrated circuit (ASIC), other chipsets, logic circuits, registers, communication modems, data processing devices, and the like, known in the art to execute various control logic performed in the present disclosure. Also, when the control logic is implemented in software, the control unit 250 may be implemented as a set of program modules. At this time, the program module may be stored in a memory and executed by the control unit 250. The memory may be positioned inside or out of the control unit 250 and may be connected to the control unit 250 by various well-known means.

In addition, the battery pressure measuring sensor 100 according to the present disclosure may be provided in a battery pack. That is, the battery pack according to the present disclosure may include the above-described battery pressure measuring sensor 100, one or more battery cells, and a battery management system (BMS). In addition, the battery pack may further include electrical components (relays, fuses, etc.) and a case.

For example, the battery pressure measuring sensor 100 may be attached to each battery cell. Also, a plurality of battery cells to which the battery pressure measuring sensor 100 is attached may be included in the battery pack.

The BMS may be connected to each of the plurality of battery pressure measuring sensors 100 to detect the swelling state and the swelling occurrence location of each of the plurality of battery cells.

Therefore, various accidents such as fire or explosion of the battery pack may be prevented in advance by more precisely diagnosing the state of each battery cell included in the battery pack.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

100: battery pressure measuring sensor
110: substrate
110*a*: first location
110*b*: second location
120: variable resistor unit
130: sensing line
200: battery pressure measuring apparatus
210: upper plate
220: lower plate
230: fixing unit
240: protection plate
250: control unit
260: charging and discharging unit

What is claimed is:

1. A battery pressure measuring sensor, comprising:
a substrate configured to be placed on a battery;
a plurality of variable resistor units respectively provided at a plurality of locations on the substrate and configured to respectively change a resistance value within a corresponding resistance range according to a pressure applied to each variable resistor unit, the plurality of variable resistor units are provided at a first location where a swelling risk in the battery is relatively low and at a second location where the swelling risk is relatively high; and
a plurality of sensing lines connected to the plurality of variable resistor units, respectively,
wherein the resistance range of the resistance value according to the pressure of the variable resistor unit provided at the first location is a first resistance range, and the resistance range of the resistance value according to the pressure of the variable resistor unit provided at the second location is a second resistance range, and a lower limit of the first resistance range is equal to or greater than an upper limit of the second resistance range.

2. The battery pressure measuring sensor according to claim 1, wherein the first location is within a center portion of the substrate, and the second location is within a peripheral portion of the substrate that excludes the center portion.

3. The battery pressure measuring sensor according to claim 1, wherein the plurality of variable resistor units are configured such that the resistance value is set as a criterion resistance value when the pressure is not applied.

4. The battery pressure measuring sensor according to claim 3, wherein an upper limit of the first resistance range is a resistance value corresponding to a preset swelling generation state,
the lower limit of the first resistance range and the upper limit of the second resistance range are resistance values corresponding to a preset swelling warning state, and
a lower limit of the second resistance range is a resistance value corresponding to a preset swelling dangerous state.

5. The battery pressure measuring sensor according to claim 3, wherein a wire length of a first one of the plurality of sensing lines connected to a variable resistor unit provided at the first location is longer than a wire length of a second one of the plurality of sensing lines connected to the variable resistor unit provided at the second location.

6. The battery pressure measuring sensor according to claim 3, wherein a size of a first one of the plurality of variable resistor units provided at the first location is greater than a size of a second one of the plurality of variable resistor units provided at the second location.

7. The battery pressure measuring sensor according to claim 3, wherein a first number of the plurality of variable resistor units provided at the first location is less than a second number of the plurality of variable resistor units provided at the second location.

8. A battery pressure measuring apparatus, comprising:
the battery pressure measuring sensor according to claim 1;
an upper plate and a lower plate, the battery interposed between the upper plate and the lower plate; and
a fixing unit fixing the upper plate and the lower plate to one another,
wherein the battery pressure measuring sensor is configured to be located on at least one of an upper surface or a lower surface of the battery.

9. The battery pressure measuring apparatus according to claim 8, further comprising a control unit connected to the plurality of sensing lines, the control unit configured to measure the resistance value of each of the plurality of variable resistor units and configured to judge a swelling state of the battery based on the resistance values.

10. The battery pressure measuring apparatus according to claim 9, wherein the control unit is configured to detect a location where swelling occurs in the battery based on the resistance values.

11. The battery pressure measuring apparatus according to claim 8, further comprising a protection plate provided between the battery pressure measuring sensor and the battery and configured to be fixed together with the upper plate and the lower plate by the fixing unit.

12. A battery pack, comprising the battery pressure measuring sensor according to claim 1.

13. A battery pressure measuring apparatus, comprising:
a battery pressure measuring sensor including a substrate configured to be placed on at least one of an upper surface or a lower surface of a battery, a plurality of variable resistor units respectively provided at a plurality of locations on the substrate and configured to respectively change a resistance value within a corresponding resistance range according to a pressure applied to each variable resistor unit, and a plurality of sensing lines connected to the plurality of variable resistor units, respectively;
an upper plate and a lower plate configured to receive the battery interposed therebetween;
a fixing unit fixing the upper plate and the lower plate to one another;
a control unit connected to the plurality of sensing lines, the control unit configured to measure the resistance value of each of the plurality of variable resistor units and configured to judge a swelling state of the battery based on the resistance values; and
a charging and discharging unit configured to charge and discharge the battery, wherein the control unit is configured to judge a swelling state of the battery during charging and discharging of the battery.

* * * * *